United States Patent [19]
Grimm et al.

[11] Patent Number: 5,970,910
[45] Date of Patent: Oct. 26, 1999

[54] METHOD OF MILKING AN ANIMAL AND A MILKING MACHINE

[75] Inventors: Hartmut Grimm, Stuttgart, Germany; Lars Innings, Huddinge, Sweden; Ole Lind, Tumba, Sweden; Günter Schlaiss, Tumba, Sweden; Benny Örnerfors, Järfälla, Sweden

[73] Assignee: Alfa Laval Agri AB, Tumba, Sweden

[21] Appl. No.: 09/091,717

[22] PCT Filed: Nov. 27, 1996

[86] PCT No.: PCT/SE96/01554

§ 371 Date: Dec. 9, 1998

§ 102(e) Date: Dec. 9, 1998

[87] PCT Pub. No.: WO97/23127

PCT Pub. Date: Jul. 3, 1997

[30] Foreign Application Priority Data

Dec. 22, 1995 [SE] Sweden ................................ 9504595

[51] Int. Cl.⁶ ........................................................ A01J 5/00
[52] U.S. Cl. ........................................................ 119/14.02
[58] Field of Search .................... 119/14.02, 14.08, 119/14.14, 14.15, 14.17, 14.18, 14.01, 14.03

[56] References Cited

U.S. PATENT DOCUMENTS

| | | | |
|---|---|---|---|
| 3,754,532 | 8/1973 | Troberg et al. | 119/14.08 |
| 3,900,005 | 8/1975 | Goldsmith | 119/14.08 |
| 4,572,104 | 2/1986 | Rubino | 119/14.08 |
| 5,090,359 | 2/1992 | Pettersson et al. | 119/14.08 |
| 5,218,924 | 6/1993 | Thompson et al. | 119/14.02 |
| 5,443,035 | 8/1995 | Lind et al. | 119/14.02 |
| 5,697,323 | 12/1997 | Visigalli | 119/14.02 |

FOREIGN PATENT DOCUMENTS

| | | |
|---|---|---|
| WO9212625 | 8/1992 | European Pat. Off. |
| 2539868 | 1/1978 | Germany |
| WO9314625 | 8/1993 | WIPO |

*Primary Examiner*—Thomas Price
*Attorney, Agent, or Firm*—Hovey, Williams, Timmons & Collins

[57] ABSTRACT

A milking machine (1) comprises at least one teatcup (2) having a teatcup liner (4) and a pulsation chamber (5), a first pressure source (14) for generating a first pressure, a second pressure source (9) for generating a sub-atmospheric second pressure, which is lower than the first pressure, and conduit means (12, 15, 13) for transmitting the first pressure and the second pressure, respectively to the pulsation chamber (5). A pulsator (11) is provided for alternately connecting the first pressure source (14) and the second pressure source (9) to the pulsation chamber (5). Influencing means (26) is provided for influencing the transmission of at least one of the first pressure and the second pressure to the pulsation chamber (5) such that the efficiency of said pressure transmission is relatively high when the momentary pressure in the pulsation chamber (5) is higher than an intermediate pressure and is relatively low when the momentary pressure in the pulsation chamber equals to or is lower than said intermediate pressure.

30 Claims, 9 Drawing Sheets

METHOD OF MILKING AN ANIMAL AND A MILKING MACHINE

BACKGROUND OF THE INVENTION

1. Field of the Invention

The present invention relates to a method of milking an animal by a milking machine having a teatcup with a teatcup liner and a pulsation chamber, a first pressure source for generating a first pressure, and a second pressure source for generating a sub-atmospheric second pressure, which is lower than the first pressure, the method comprising connecting the second pressure source to the interior of the teatcup liner, and alternately transmitting the first pressure from the first pressure source and the second pressure from the second pressure source to the pulsation chamber, to generate a pulsating pressure in the pulsation chamber, whereby the teatcup liner cyclically moves with a decreasing opening rate to an essentially open position during the transmission of the second pressure and with a decreasing closing rate to an essentially closed position during the transmission of the first pressure. Moreover, the invention relates to a milking machine comprising at least one teatcup having a teatcup liner and a pulsation chamber, a first pressure source for generating a first pressure, a second pressure source for generating a sub-atmospheric second pressure, which is lower than the first pressure, conduit means for transmitting the first pressure and the second pressure, respectively, from the first pressure source and the second pressure source, respectively, to the pulsation chamber, and a pulsator for alternately connecting the first pressure source and the second pressure source to the pulsation chamber via the conduit means, such that the teatcup liner cyclically moves with a decreasing opening rate to an essentially open position during the transmision of the second pressure and with a decreasing closing rate to an essentially closed position during the transmission of the first pressure.

2. Description of the Prior Art

A conventional milking machine comprises a cluster having a claw and four teatcups, each teatcup having a shell and a teatcup liner provided in the shell to form a pulsation chamber between the teatcup liner and the shell. During milking the interior of the teatcup liner is subjected to a sub-atmospheric pressure, i.e. normally about 50 kPa under atmospheric pressure. There are also milking machines working under high-pressure conditions, wherein the low pressure might be above atmospheric pressure. The pulsation chamber is subjected to a cyclically pulsating pressure normally varying between atmospheric pressure, when the teatcup liner is collapsed or closed and a minimum pressure level when the teatcup liner is fully open. The minimum pressure level is normally equal to said sub-atmospheric pressure level, i.e. 50 kPa under atmospheric pressure. This means that the pressure difference across the wall of the teatcup liner is essentially equal to zero when the teatcup liner is fully open.

The pulsating pressure demonstrates a pulsation cycle which may be divided into four phases, i.e. (a) an opening phase during which the pulsating pressure decreases from atmospheric pressure to normally said sub-atmospheric pressure prevailing in the interior of the teatcup liner and during which the teatcup liner moves from an essentially closed position to an essentially open position, (b) an open phase during which the pulsating pressure has reached its minimum level and is essentially equal to said sub-atmospheric pressure and during which the teatcup liner is in an open position, (c) a closing phase during which the pulsating pressure increases from about said sub-atmospheric pressure to the atmospheric pressure and during which the teatcup liner moves from the open position to the closed position, and finally (d) a closed phase during which the pulsating pressure is equal to the atmospheric pressure and the teatcup liner is in a closed position. The time relations between the open and closed positions are defined in the pulsator ratio. The opening and the closing of the teatcup liner during phase (a) and (c) respectively, comprises a very fast and abrupt movement of the teatcup liner. From a closed position, i.e. opposite wall portions of the teatcup liner touch each other, as the pulsating pressure decreases the teatcup liner remains essentially closed until it at a certain pulsating pressure level, the so called TPD-level (touch pressure difference), starts to open abruptly to the so called CCPD-level (critical collapse pressure difference) at which level the teatcup liner is fully open, i.e. said opposite wall portions of the teatcup liner are spaced apart from each other. From the point of time when the pulsating pressure is less than the CCPD-level the teatcup liner thus is essentially open and a further decrease of the pulsating pressure only results in an insignificant further opening of the teatcup liner.

Each milking may be divided into four periods, i.e. (I) the initial stimulation or massage period, (II) the main flow period, (III) the flow decreasing period, and (IV) the flow terminating period. During the initial, flow decreasing and flow terminating periods the milk flow is reduced in comparison with the main flow period.

Such conventional milking machines of today involve the following problems. During especially the flow decreasing and terminating period of each milking, when a small amount or no milk is flowing, the teats are fully subjected to the sub-atmospheric pressure prevailing in the interior of the teatcup liner. Additionally due to the opening and closing movements of the teatcup liner the volume beneath the teat will change. This volume change is compensated by air moving to the teat during the opening movement of the liner. The velocity of this moving air is very high (high jet flow). This air flow may carry milk droplets and bacteria. These droplets are accelerated and directed to the teat and are hit against the teat by the so called impact. Such high impact and high jet flow create a high risk for new infections, such as mastitis. It may happen that bacteria associated with one teat pass directly into the interior of another teat, and thereby increasing the risk of infection.

During high milk flow there appear cyclic pressure (vacuum) fluctuations beneath the teat tip due to the opening and closing movement of the teatcup liner. Such fluctuations can irritate the teats and stress the teat tissue, which negatively influences the udder health.

Moreover such pressure decrease (vacuum increase) due to the volume change in the interior of the teatcup liner during in particular the terminating period may also result in that the teatcup is crawling upwards on the teat. Such crawling at the end of the milking as the teat becomes slack leads to a throttling of the milk conducting interior of the teat, and consequently the milk flow may be interrupted although a considerable amount of rest milk remains in the udder.

These problems are all associated with the very fast and abrupt opening and closing movement of the teat cup liner. Therefore it has been proposed to slow down the opening and closing movement. However, slowing down the opening and closing movement of the teatcup liner also results in a time delay until the liner starts moving. Therefore, milk flow from the teats might be delayed in comparison to a teatcup liner working in the conventional manner. This problem which is of greatest significance during the main flow period, may lead to the milking operation as a whole being prolonged.

WO-A-9 212 625 discloses a method of milking an animal by using a milking machine having at least one teatcup with a teatcup liner and a pulsation chamber. The method of this document aims at a reduction of the rest milk and a more gentle treatment of the teats of the animal, and at the same time a rapid milk extraction should be maintained. To this end, the milking machine is operated to cyclically pressurize the pulsation chamber such that during each pulsation cycle the liner opens and/or closes at a slower rate during the initial and/or flow decreasing and terminating periods of the milking operation than during the main flow period of the milking operation. This method thus involves an extended a-phase or c-phase of each pulsation cycle.

U.S. Pat. No. 5,218,924 discloses a milking system in which the pulsator is replaced by a variable pressure source, in order to permit transmission of a controllably variable pressure to the pulsation chamber, i.e. it is possible to vary the rate of change of pressure supplied by the variable pressure source to the pulsation chamber. This document aims at a shorter transition time between the maximum pressure level and the minimum pressure level in the pulsation chamber. Thereby the liner movement is speeded up in comparison to conventional milking, such that this movement from a fully closed to a fully open liner and from a fully open to a fully closed liner, respectively, will occur within a very short time period of 0.05 seconds. Such a rapid transition movement is produced by an almost instantaneous pressure change in the pulsation chamber, followed by a somewhat slower rate of pressure change, which in turn is followed by a final almost instantaneous pressure change.

SUMMARY OF THE INVENTION

The object of the present invention is to overcome the disadvantages mentioned above and to provide an improved way of milking. In particular said way of milking should without negatively influencing the milking productivity involve a more gentle treatment of the teats and result in less rest milk.

This object is obtained by the method initially defined, which is characterized in that at least one of the first pressure and the second pressure is transmitted from the first pressure source and the second pressure source, respectively, to the pulsation chamber at a relatively high efficiency when the momentary pressure in the pulsation chamber is higher than an intermediate pressure, which is lower than the first pressure and higher than the second pressure, and at a relatively low efficiency when the momentary pressure in the pulsation chamber equals to or is lower than said intermediate pressure.

The term "high-efficiency" is meant to include normal, full application of the sub-atmospheric pressure and atmospheric pressure, respectively, to the pulsation chamber, whereas the term "low-efficiency" is meant to include any operational measures taken to slow down the opening and closing movement, respectively, of the teatcup liner.

The low-efficiency transmission will result in a slower liner movement and therefore the building up of a vacuum in the interior of the teatcup liner will be reduced. Thus, the vacuum peaks beneath the teat may be reduced, so that the teats are not irritated and the teat tissue not stressed, and furthermore the inventive method results in less high jet flow and less high impact, significantly reducing the risk for infections.

Due to the slower liner movement, the teat cup liner may under circumstances not reach a fully open state during each pulsation cycle. However, contrary to the general opinion among those skilled in the art it has been recognized that the milk flow during the main flow period will not be reduced and the milking time will not be prolonged, provided that the teatcup liner only passes the abrupt movement from the essentially closed position to the essentially open position during each pulsation cycle. Thus, the inventive way of milking may be utilized during the whole milking operation and a high milking productivity may be maintained.

Furthermore, teatcup crawling and throttling of the milk conducting interior of the teat may be prevented by the inventive method. Since the opening movement of the teatcup liner is slowed down it is more likely that a good frictional contact between the teat and the teatcup liner is maintained also when the teat becomes slack during the flow decreasing and terminating periods, so that crawling of the teatcup will diminish and milking can continue and the amount of rest milk is reduced.

Preferred embodiments of the method according to the invention are defined in the dependent claims 2–9.

According to one embodiment said relatively low-efficiency transmission of at least one of said first pressure and said second pressure is produced by throttling a passage through which said transmission takes place. By such a measure the relatively low-efficiency transmission may be produced in a very simple and effective manner.

The change from relatively high-efficiency transmission to relatively low-efficiency transmission and vice versa is done at a point of time when the momentary pressure in the pulsation chamber is at said intermediate pressure level. Such an intermediate pressure level will prevail in the pulsation chamber when the teatcup liner abruptly moves to one of the essentially open and closed positions. Thus, by sensing the movement of the teatcup liner when the teatcup liner abruptly moves to one of the essentially open and closed positions, it is possible to determine when the change from the relatively high-efficiency transmission to the relatively low-efficiency transmission should occur. Thus, the change between high- and low-efficiency pressure transmission may be performed by the step of determining that the momentary pressure in the pulsation chamber equals to or is lower than said intermediate pressure, when the teatcup liner abruptly moves to said open position, and is higher than said intermediate pressure, when the teatcup liner has abruptly moved to said closed position. Furthermore, the method may comprise the steps of sensing the movement of the teatcup liner, when the teatcup liner abruptly moves to one of the open and closed positions, and using said sensed abrupt movement of the teatcup liner for determining whether said relatively high- or low-efficiency transmission is to be performed. Such an intermediate pressure level will also prevail in the pulsation chamber when the milk flow from the teat of the animal during at least one pulsation cycle starts or ceases. Thus, it is also possible to determine the change from the relatively high-efficiency transmission to the relatively low-efficiency transmission by detecting the point of time of milk flow start or cessation. Moreover, such an intermediate pressure level will also prevail in the pulsation chamber at the point of time when the volume of the pulsation chamber abruptly changes. Thus, it is also possible to determine when said change should occur by detecting the point of time when the volume of the pulsation chamber abruptly changes. Thereby, it is possible to continuously control when the relatively high-efficiency transmission and the relatively low-efficiency transmission, respectively, should be performed, and thereby optimize the method according to the invention. According to another embodiment of the invention said intermediate pressure is predetermined.

The object mentioned above is also obtained by the milking machine initially defined, which is characterized in that means is provided for influencing the transmission of at least one of the first pressure and the second pressure from the first pressure source and the second pressure source, respectively, to the pulsation chamber such that efficiency of said pressure transmission is relatively high when the momentary pressure in the pulsation chamber is higher than an intermediate pressure, which is lower than the first pressure and higher than the second pressure, and is relatively low when the momentary pressure in the pulsation chamber equals to or is lower than said intermediate pressure.

Preferred embodiments of the milking machine are defined in the dependent claims 11–30.

BRIEF DESCRIPTION OF THE DRAWINGS

Various embodiments of the present invention will now be described with reference to the accompanying drawings, in which FIG. 1 schematically shows a view of a milking machine according to the invention, which is provided with a throttle valve.

DETAILED DESCRIPTION OF VARIOUS EMBODIMENTS OF THE PRESENT INVENTION

Figure 1:
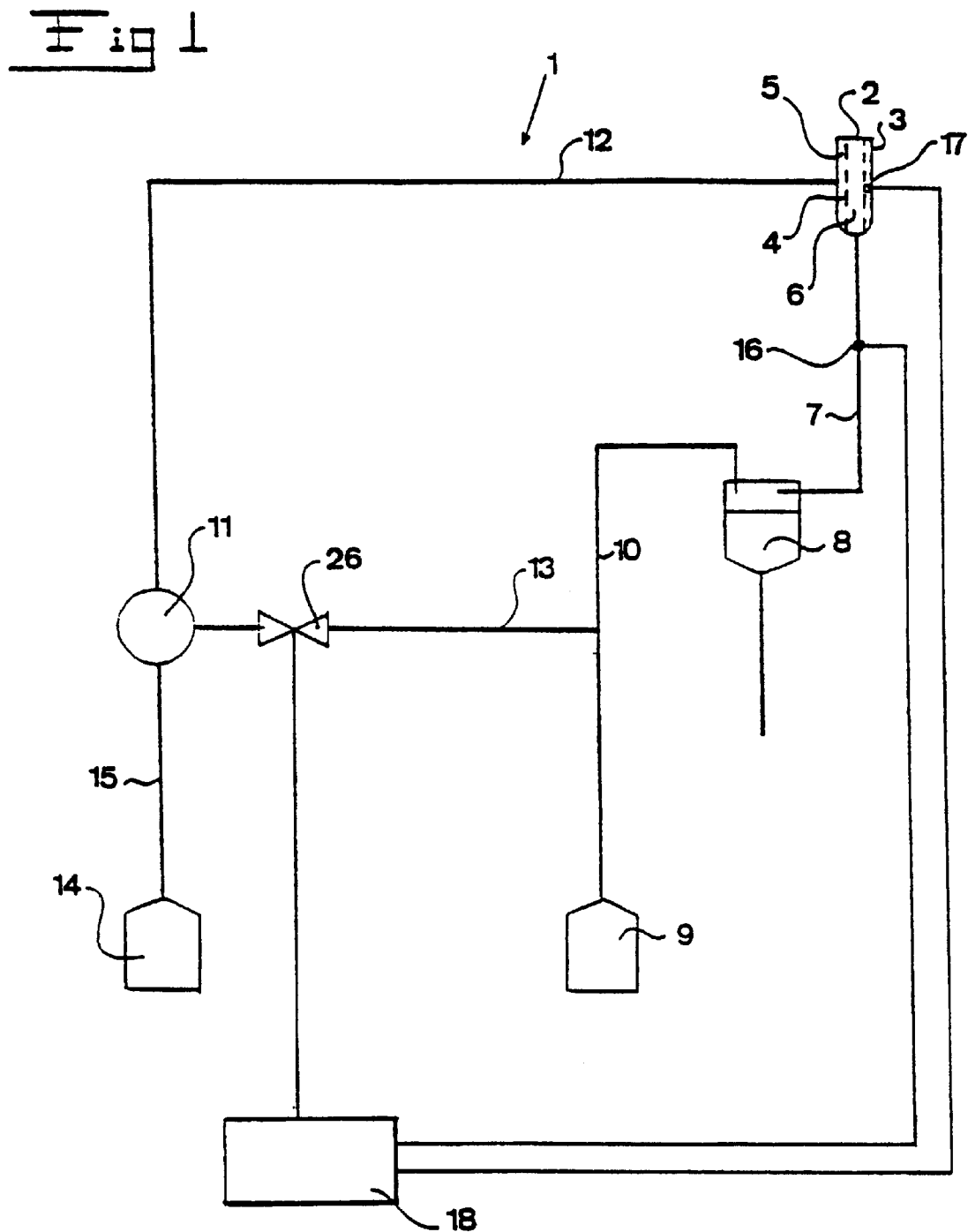

With reference to FIGS. 1–8, there is schematically disclosed a milking machine 1 comprising a teatcup 2 with a shell 3 and a teatcup liner 4 provided in the shell 3. It should be noted that although only one teatcup 2 is disclosed, the milking machine 1 may include more teatcups, for example four, depending on the animal to be milked. Between the shell 3 and the teatcup liner 4 there is formed a pulsation chamber 5. The interior of each teatcup liner 4 forms a milk conducting passage 6. From the milk conducting passage 6 a milk passage 7 leads to a receptacle 8, the interior of which is subjected to a sub-atmospheric low pressure LP by a low-pressure source 9 via a low pressure passage 10. A pulsator 11 is connected to the pulsation chamber 5 via a pulsation passage 12, to the low-pressure source 9 via a low-pressure passage 13, and to a high-pressure source 14 via a high-pressure passage 15. The high-pressure source 14 generates a relatively high pressure HP and may be formed by the atmosphere, thus the relatively high pressure HP may be equal to the atmospheric pressure. Furthermore, the milking machine 1 may comprise a milk flow sensor 16, provided to sense the momentary milk flow through the milk conducting passage 6 or milk passage 7. There may also be a sensor 17 provided in the pulsation chamber 5 or in the pulsation passage 12. The sensor 17 is provided to sense the movement of the teatcup liner 4, at least when the teatcup liner 4 abruptly moves between an essentially open position and an essentially closed position. The sensor 17 may be in a form of a pressure sensor measuring the momentary pressure in the pulsation chamber during each pulsation cycle or a flow meter measuring the momentary air flow to and from the pulsation chamber. Moreover, the sensor may be in a form of a distance measuring device measuring the momentary distance between the shell 3 and the teatcup liner 4. The different sensors 16, 17 may be connected to a control device 18 to be further described below.

During milking the teatcup 2 is attached to the teat of a cow to be milked. High pressure HP from the high-pressure source 14 and low pressure LP from the low-pressure source 9 is alternately transmitted to the pulsation chamber 5 by means of the pulsator 11. Thereby, a pulsating pressure is generated in the pulsation chamber 5, so that the teatcup liner 4 cyclically moves to an essentially open position during the transmission of the low pressure LP and to an essentially closed position during the transmission of the high pressure HP. Since the low pressure LP is also transmitted via the passages 10 and 7 to the milk conducting passage 6 in the interior of the teatcup liner 4, milk will be sucked from the teat of the cow when the teatcup liner 4 is in its essentially open position.

Figure 9:
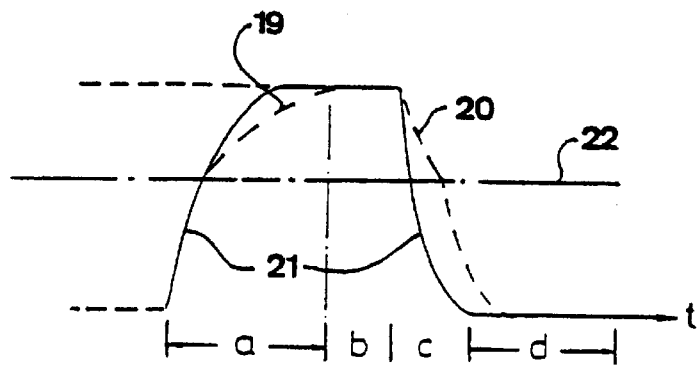
FIG. 9 shows a graph illustrating the pressure in the pulsation chamber as a function of time.
Figure 10:
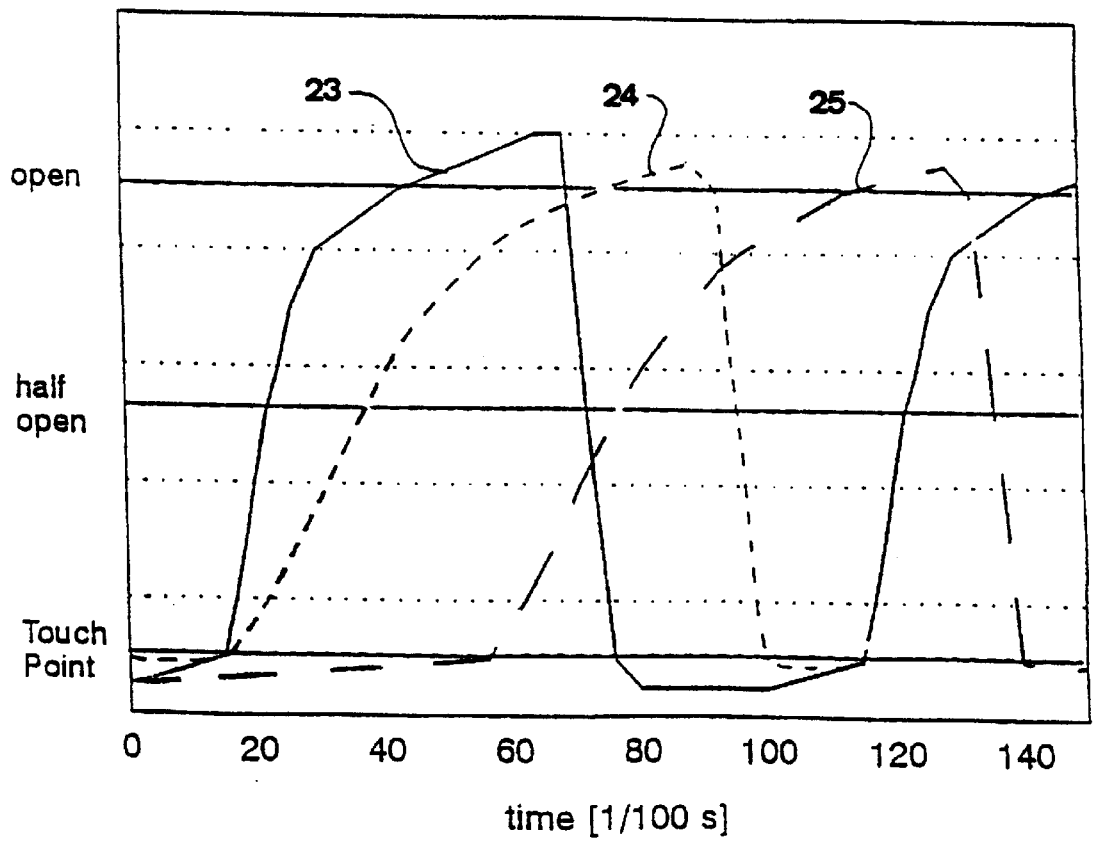
FIG. 10 shows a graph illustrating the position of the teatcup liner as a function of time.

The milking machine 1 disclosed in FIGS. 1–8 also comprises an influencing means to be further described below and provided for influencing the transmission of at least one of the high pressure HP and the low pressure LP from the high-pressure source 14 and the low-pressure source 9, respectively, to the pulsation chamber 5, such that the efficiency of said pressure transmission is relatively high when the momentary pressure in the pulsation chamber 5 is higher than an intermediate pressure, which is lower than the high pressure HP and higher than the low pressure LP, and is relatively low when the momentary pressure in the pulsation chamber 5 equals or is lower than said intermediate pressure. Such influencing means will result in a pressure curve illustrated in FIG. 9 with broken lines 19, 20. Thereby, the broken line 19 illustrates low-efficiency transmission of the low pressure LP from the low-pressure source 9 and the broken line 20 illustrates the low-efficiency transmission of the high pressure HP from the high-pressure source 14. The curve 21 illustrates the momentary pressure in the pulsation chamber 5 according to prior art milking. The change between high-efficiency transmission and low-efficiency transmission is done at the intermediate pressure level 22. FIG. 10 shows the position of the teatcup liner 4 as a function of time. Thereby, the curve 23 illustrates the prior art milking and the broken line 24 illustrates low-efficiency transmission of the low pressure LP during the opening phase of the teatcup liner 4. The change from high-efficiency transmission to low-efficiency transmission occurs at TPD, which thus forms the intermediate pressure 22. As may be seen from FIG. 10, the transmission of the low pressure LP is influenced such that the opening rate of the teatcup liner movement (curve 24) decreases during each pulsation cycle. The curve 25 of FIG. 10 illustrates the teatcup liner movement when the transmission of the low pressure is slowed down from the beginning of the pulsation cycle as proposed in WO-A-9 212 625. FIG. 10 only illustrates low-efficiency transmission of the low pressure LP. As may be seen in the curve 19 in FIG. 9 the application rate of the low pressure LP is such that the rate of the pressure decrease in the pulsation chamber 5 decreases. The curve 20 illustrates that the application rate of the high pressure HP during the closing phase of the teatcup liner 5 is such that the rate of the pressure increase in the pulsation chamber 5 decreases up to the intermediate level 22.

In the milking machine 1 disclosed in FIG. 1, the influencing means comprises a throttle valve 26 provided on the low-pressure passage 13. The throttle valve 26 may for example have an opening with a cross-section area which is variable between a first relatively small opening to produce a relatively low-efficiency transmission of the low pressure LP from the low-pressure source 9 and a second relatively large opening to produce a relatively high-efficiency transmission of said low pressure LP. The change between the small opening and the large opening may be controlled by the controll means 18. Thus, the opening movement of the teatcup liner 4 may be slowed down by means of the throttle valve 26, compare line 19 in FIG. 9 and line 24 in FIG. 10. It should be noted that the valve 26 also may be provided on the pulsation passage 12 to produce the same effect. A similar throttle valve may also be provided on the high-pressure passage 15 to slow down the closing movement of the teatcup liner 4, compare line 20 in FIG. 9.

Figure 2:
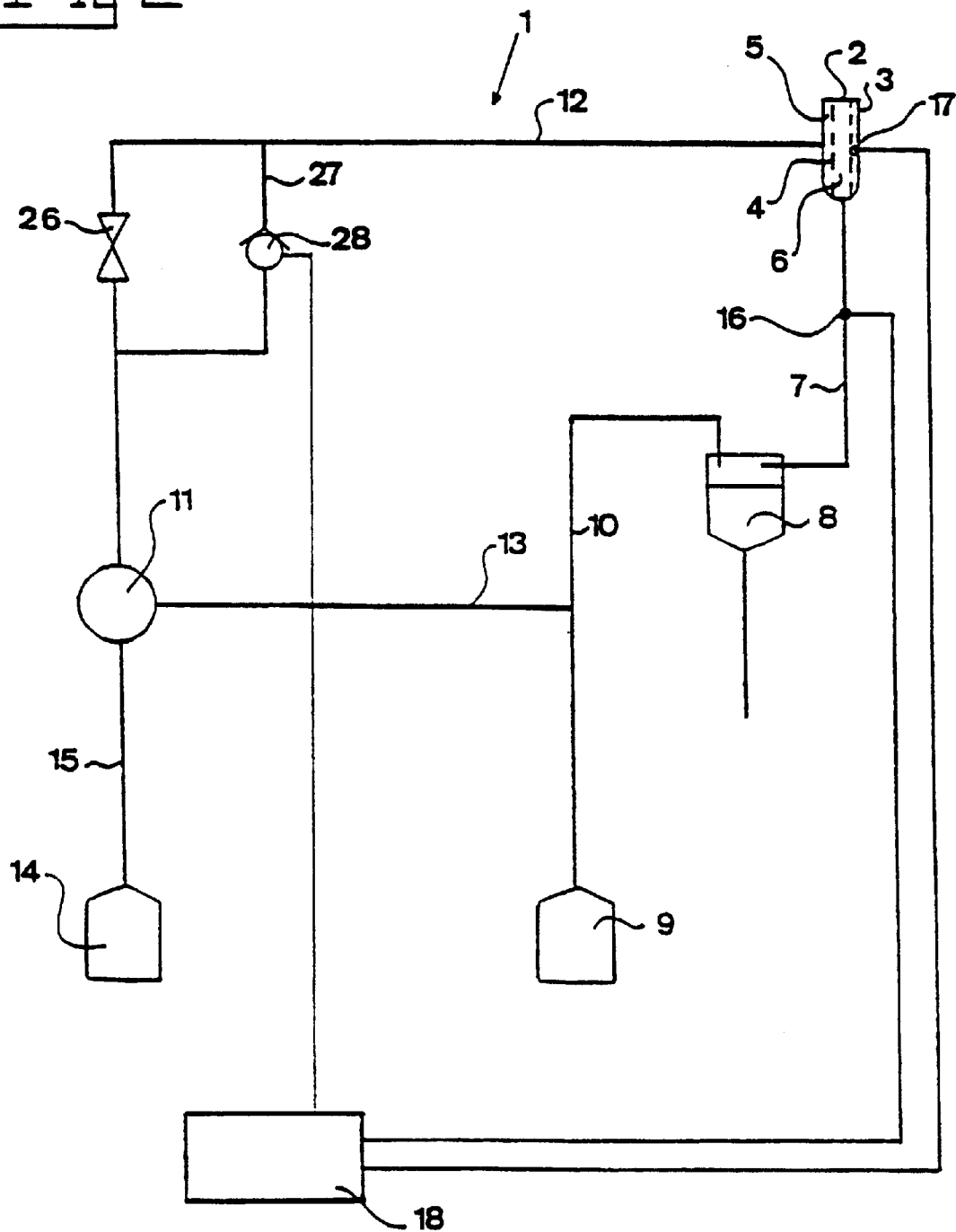
FIG. 2 shows a similar view, of a milking machine provided with a by-pass conduit.

In the milking machine 1 disclosed in FIG. 2, the influencing means comprises a throttle valve 26 and a by-pass conduit 27. The throttle valve 26 is provided on the pulsation passage 12 and the by-pass conduit 27 in parallel thereto. Moreover, the by-pass conduit 27 is provided with a non-return valve 28 having a delay function. When transmitting for example the low pressure LP from the low-pressure source 9, the relatively high pressure in the pulsation chamber 5 will first of all be evacuated through the valve 26 and conduit 27, and after a certain time interval the delay function of the non-return valve 28 will close the conduit 27, only permitting passage through the valve 26. Thereby, the high-efficiency transmission will change to low-efficiency transmission. Also in this case it would be possible to arrange the valve 26 and the valve 28 on the low-pressure passage 13. In order to produce low-efficiency transmission during the transmission of the high pressure HP from the high-pressure source 14, the non-return valve 28 should be directed in the opposite direction. By providing such an arrangement of a throttle valve 26 and a non-return valve 28 on both the high-pressure passage 15 and the low-pressure passage 13, it is possible to slow down both the opening movement and the closing movement of the teatcup liner 4. The throttle valve 26 in this example may be in a form of conduit having a reduced passage diameter or an adjustable throttle valve permitting adjustment of the throttling degree.

Figure 3:
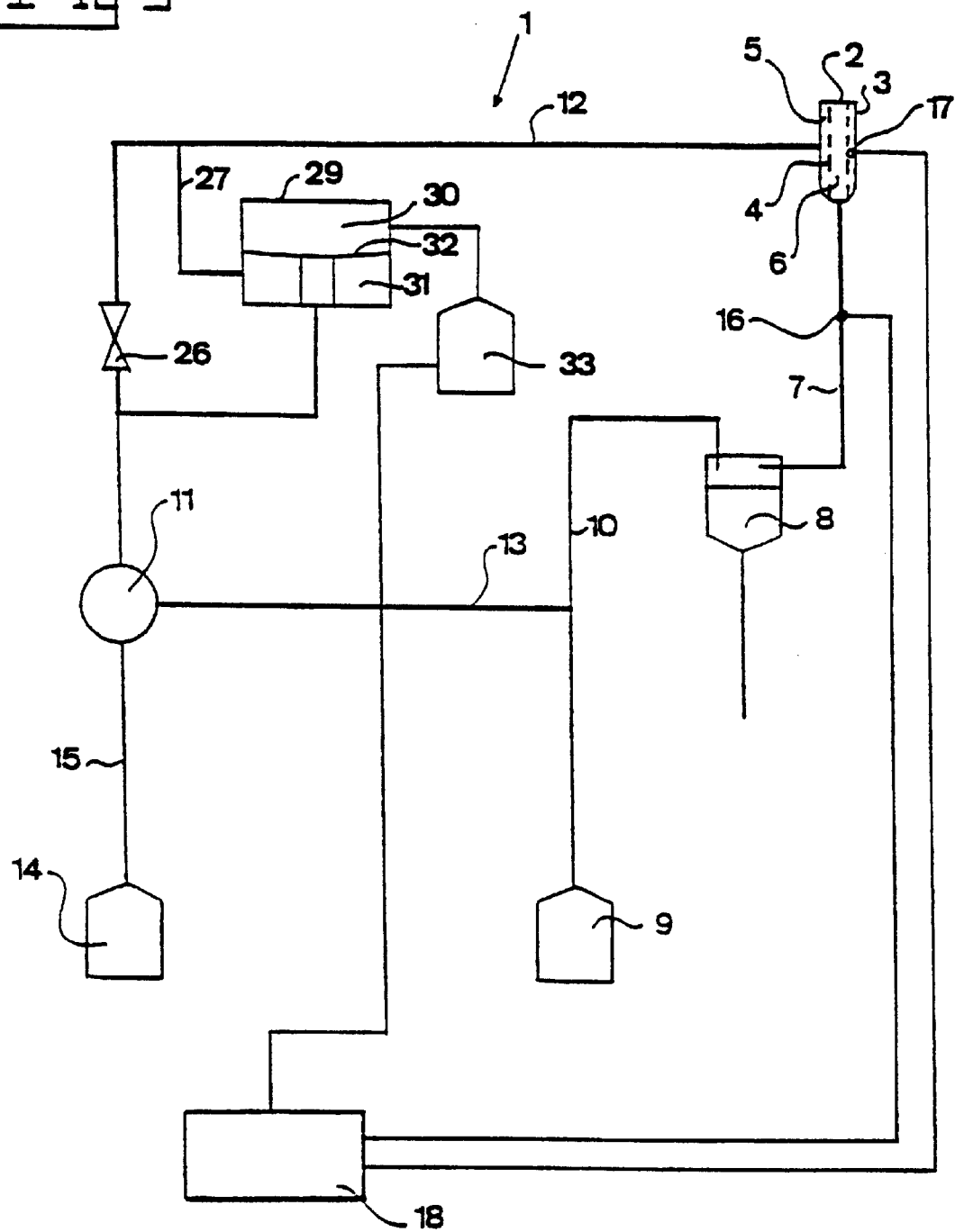
FIG. 3 shows a similar view, of a milking machine provided with a servo-valve.

The milking machine 1 disclosed in FIG. 3 is very similar to the one in FIG. 2, wherein the non-return valve is replaced by a servo-valve 29. The servo-valve 29 is divided into two chambers 30, 31 by means of a membrane 32. The chamber 30 is connected to a servo-pressure source 33 transmitting a servo-pressure to the chamber 30. The chamber 31 is a part of the by-pass conduit 27 and the by-pass conduit 27 is closed by the membrane 32 when the pressure in the chamber 30 is higher than the pressure in the chamber 31. Thus, when the pressure in the servo-pressure source 33 is higher than the pressure in the pulsation chamber 5 the servo-valve 29 will be closed, thereby only permitting transmission of high pressure HP and low pressure LP, respectively, through the throttle valve 26. Also in this case the throttle valve 26 may be a conduit having a small passage diameter or an adjustable throttle valve.

Figure 4:
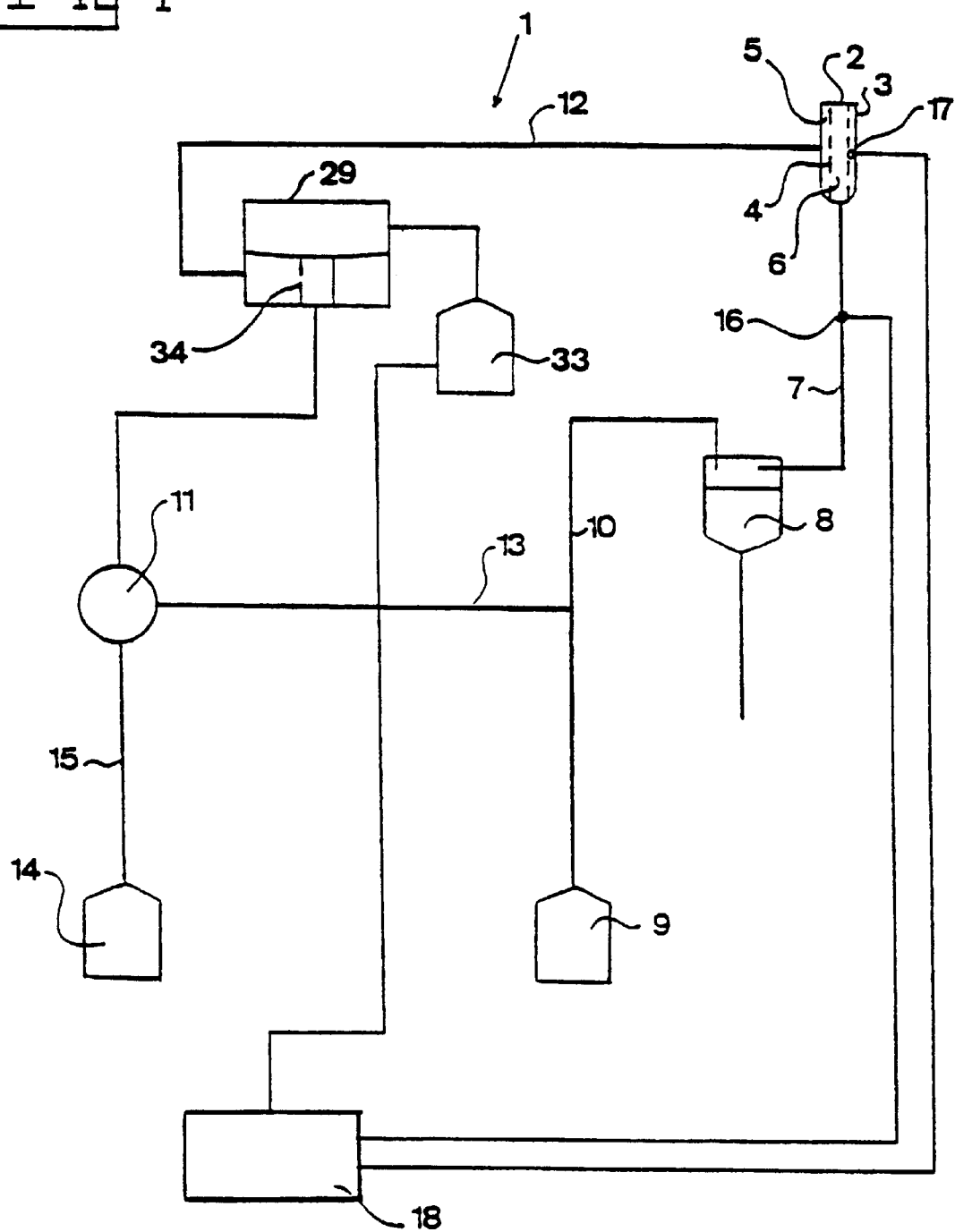
FIG. 4 shows a view of a milking machine similar to that in FIG. 3.

In the milking machine 1 of FIG. 4, the throttle valve 26 is replaced by a small opening 34 provided as an integrated part of the servo-valve 29 and permitting throttled passage through the servo-valve 29 when the membrane 32 is in the closed position.

Figure 5:
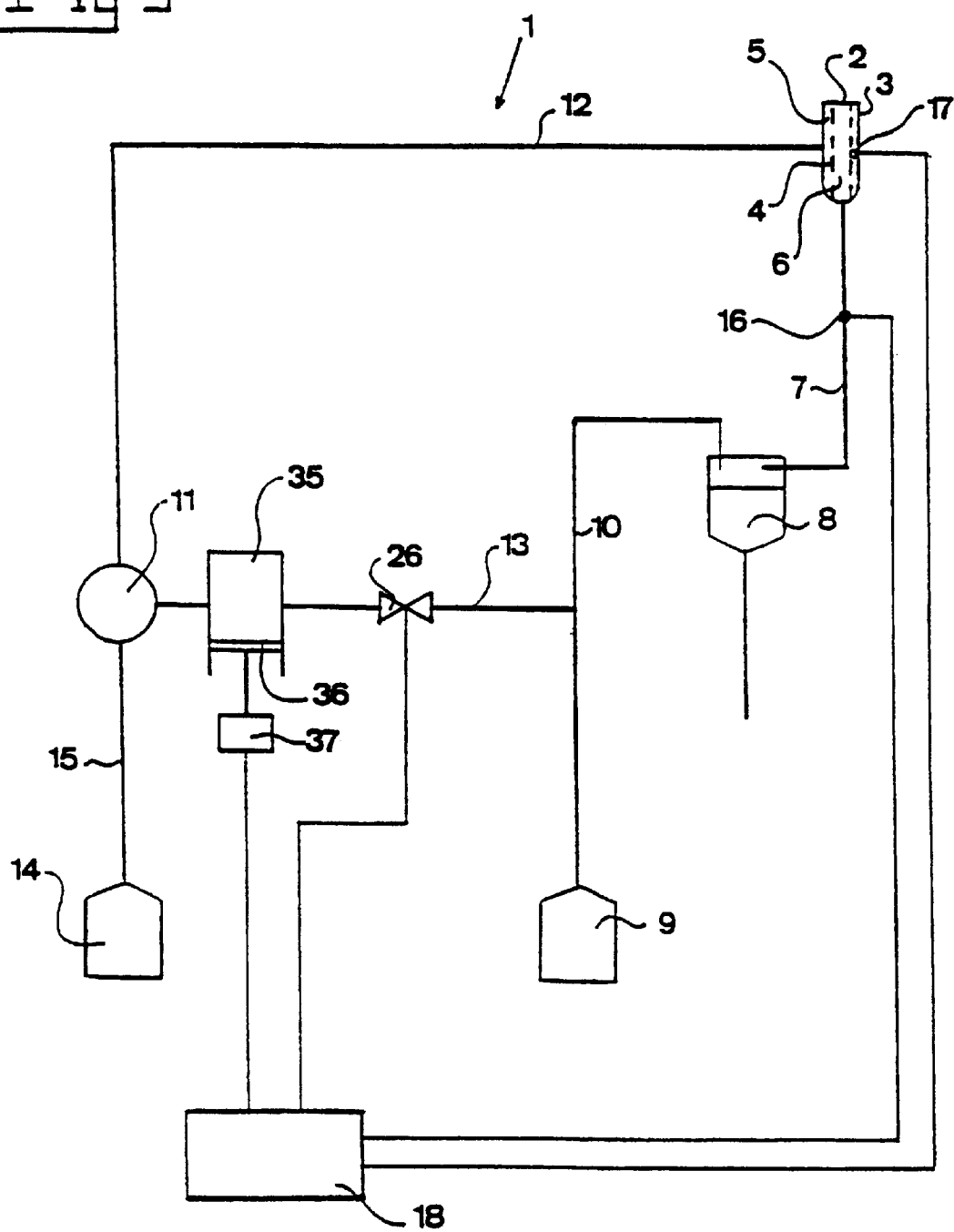
FIG. 5 shows a similar view of a milking machine having a buffer.

The milking machine 1 disclosed in FIG. 5 comprises a throttle valve 26 provided on the low-pressure passage 13 and a buffer 35 provided on the low-pressure passage 13 between the throttle valve 26 and the pulsator 11. The buffer 35 encloses a buffer volume and this volume may be variable. In the example disclosed, the buffer 35 is in a form of a cylinder and in the cylinder there is provided a movable piston 36 which by means of a servo-motor 37 may be positioned so that a suitable volume is enclosed in the cylinder. In this arrangement, low pressure LP is continuously transmitted from the low-pressure source 9 to the buffer 35, i.e. in case of a sub-atmospheric pressure in the pressure source 9 the buffer 35 is evacuated with a reduced transmission capacity due to the throttle valve 26. Thus, the transmission of the low pressure LP to the pulsation chamber 5 will be relatively highly efficient as long as there is a low-pressure capacity in the buffer 35. Thereafter, the transmission will be of relatively low efficiency due to the throttle valve 26. A similar arrangement of a buffer 35 and a throttle valve 26 on the high-pressure passage 15 permits transmission of the high pressure HP with a relatively high efficiency as long as there is a high-pressure capacity in the buffer 35 and thereafter with a relatively low efficiency to produce a slower closing movement of the teatcup liner 4.

Figure 6:
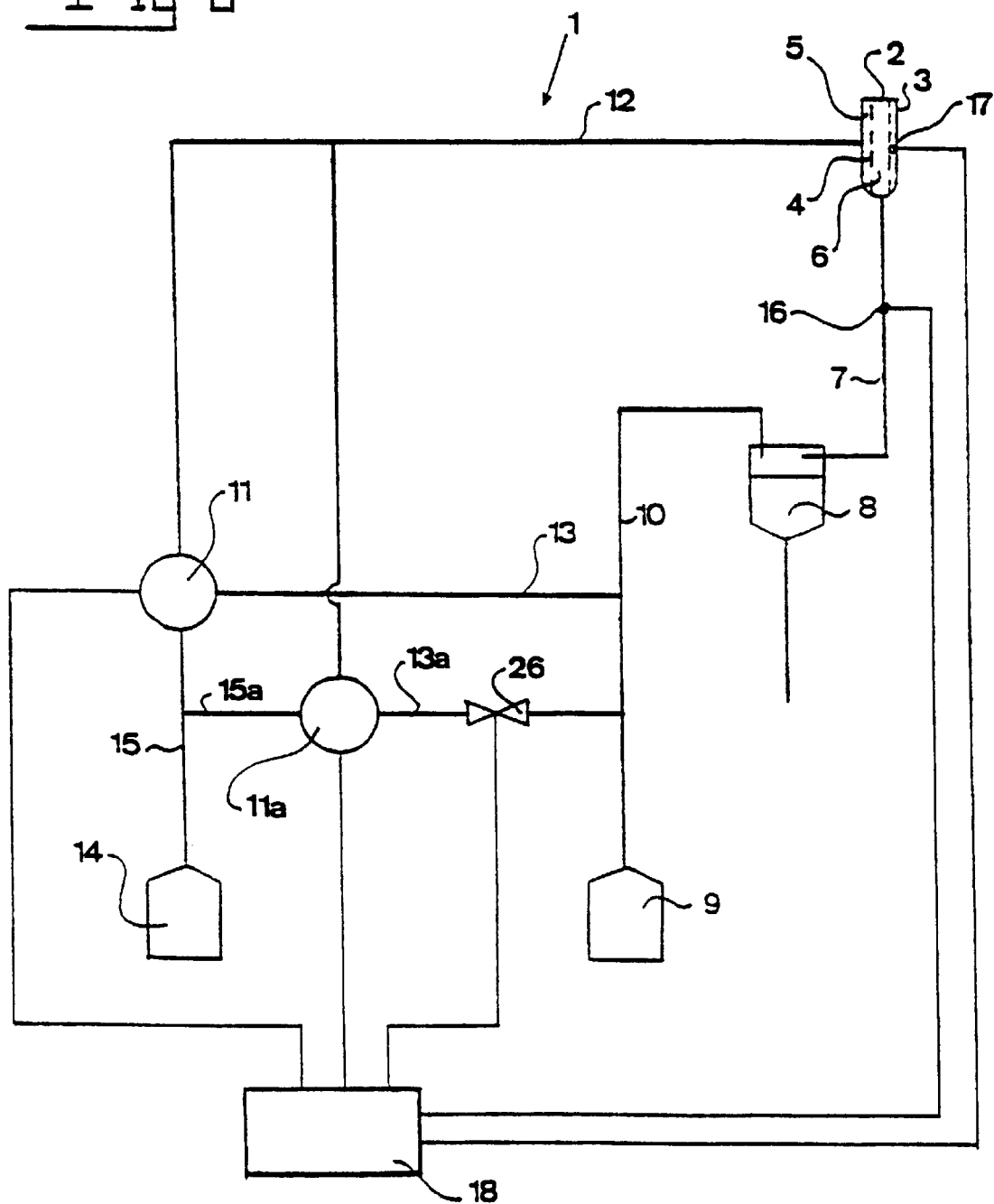
FIG. 6 shows a similar view of a milking machine having two pulsators.

In the milking machine 1 disclosed in FIG. 6, the influencing means comprises a first and second pulsator 11, 11a, provided in parallel with each other. The low-pressure passage 13a to the second pulsator 11a is provided with a throttle valve 26. The pulsators 11, 11a are adjusted such that the first unthrottled pulsator 11 is provided to be open when the momentary pressure in the pulsation chamber 5 is higher than an intermediate pressure 22 and to be closed when said momentary pressure equals to or is lower than said intermediate pressure 22 and that the second, throttled pulsator 11a is provided to be open at least when said momentary pressure equals to or is lower than said intermediate pressure 22. The disclosed arrangement thus permits relatively low-efficiency transmission of the low pressure LP from the the low-pressure source 9 to slow down the teatcup liner movement. However, by providing the throttle valve 26 on a high-pressure passage 15a to the pulsator 11a it would also in a similar manner be possible to transmit the high pressure HP from the high-pressure source 14 with a relatively low efficiency to slow down the closing movement of the teatcup liner 4. It should be noted that the throttle valve 26 may be provided on the pulsation passage 12 as well as on the low-pressure passage 13a and the high-pressure passage 15a.

Figure 7:
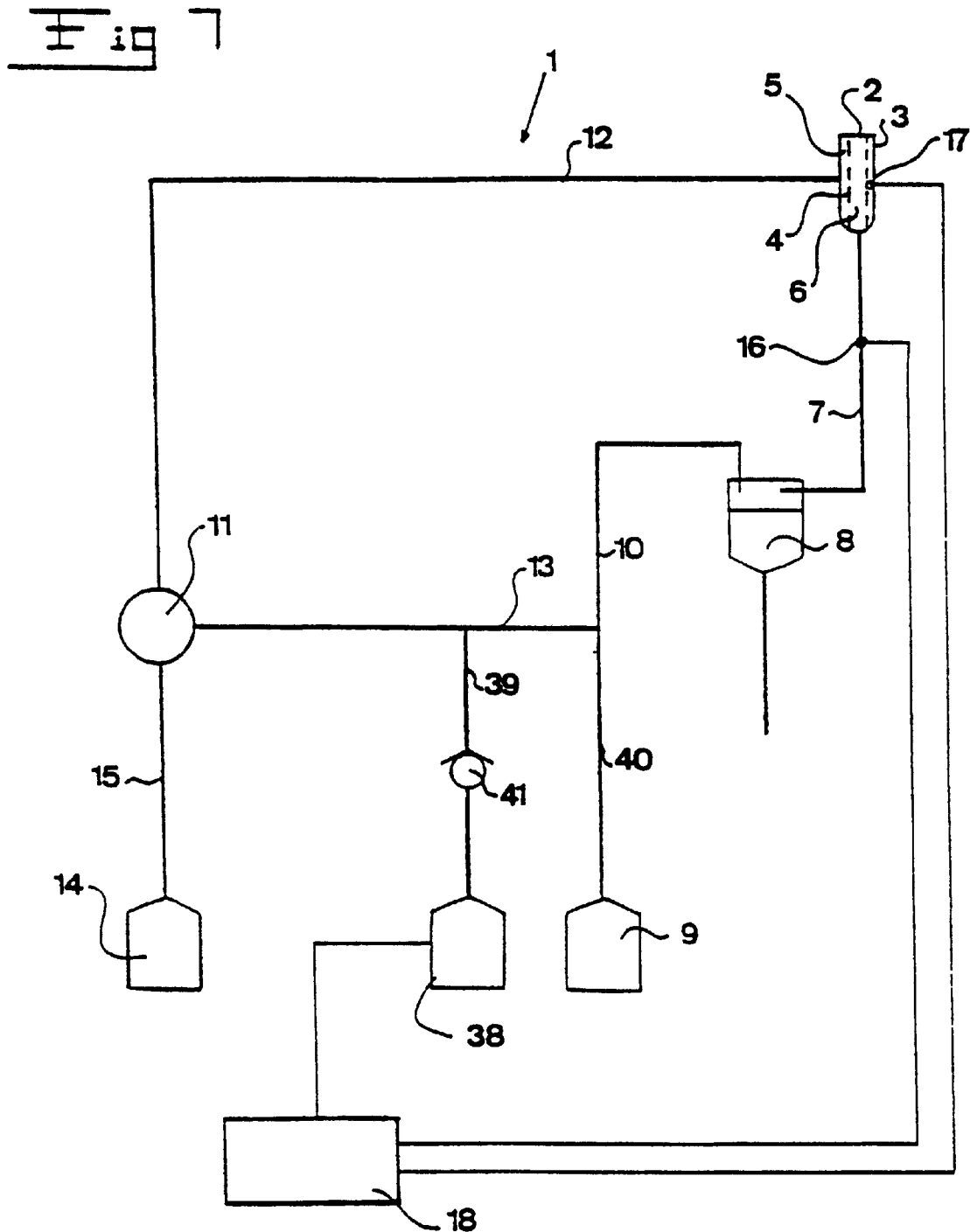
FIG. 7 shows a similar view of a milking machine comprising two low-pressure sources.

In the milking machine 1 disclosed in FIG. 7, the influencing means comprises a third pressure source 38 which is provided to generate a third pressure corresponding to an intermediate pressure level 22. The third pressure source 38 is via a passage 39 connected to the low-pressure passage 13 and the low-pressure source 9 is via a passage 40 connected to the low-pressure passage 13. The passages 39 and 40 are in parallel with each other and the total cross-section area of the passages 39, 40 is essentially equal to that of the low-pressure passage 13. Thereby, low pressure will be transmitted with relatively high efficiency as long as the momentary pressure in the pulsation chamber 5 is equal to or lower than the pressure in the third pressure source 38. Thereafter, the reduced cross-section area of the passage 40 will result in a relatively low-efficiency transmission of the low pressure LP from the low-pressure source 9. To prevent that the low pressure LP from the low-pressure source 9 is transmitted to the third pressure source 38, a non-return valve 41 may be provided on the passage 39. It is also possible to provide a fourth pressure source delivering a pressure of an intermediate level 22 in parallel with the high-pressure source 14 to permit, in a similar way, low-efficiency transmission of high pressure HP during the closing movement of the teatcup liner 4.

Figure 8:
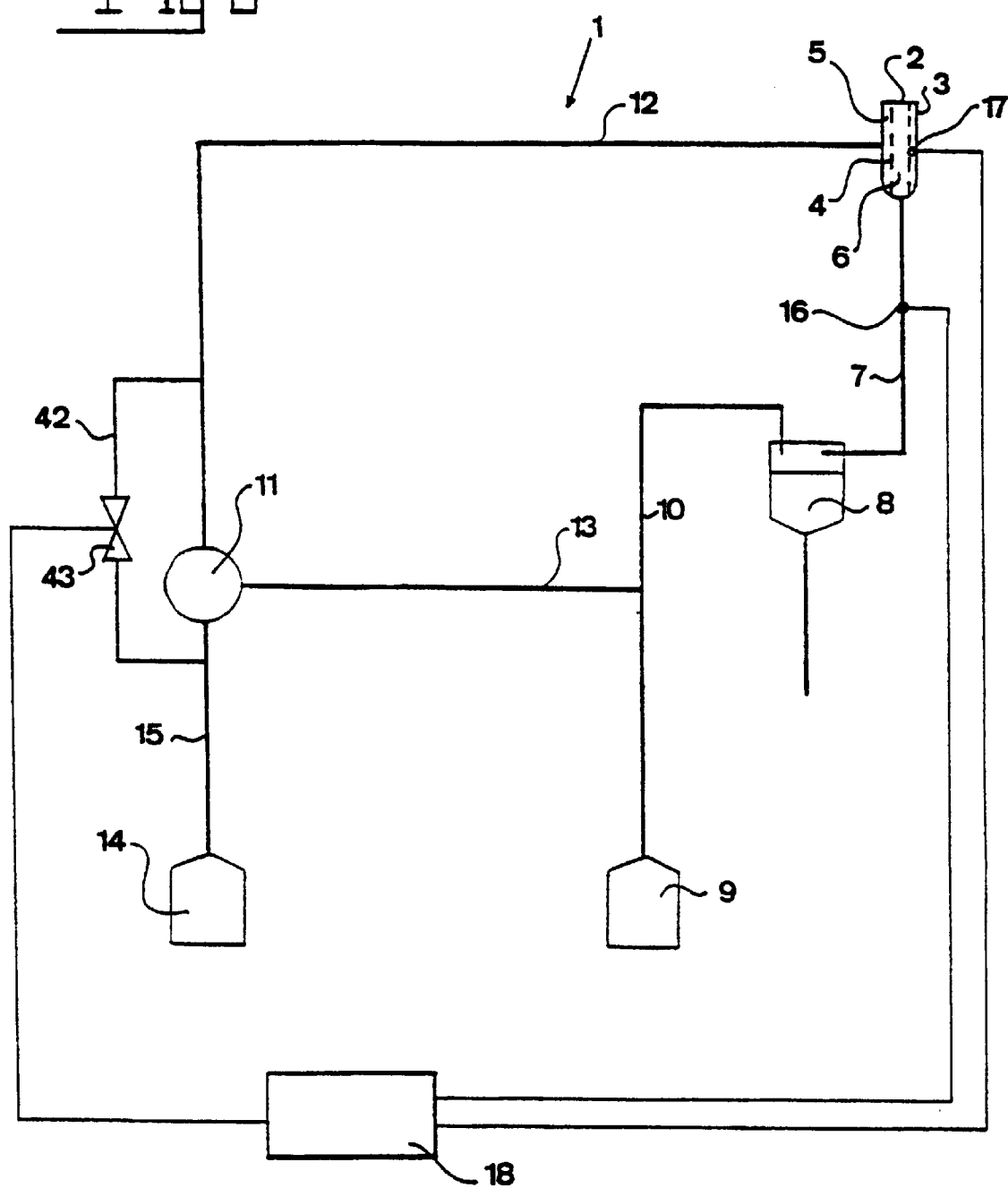
FIG. 8 shows a similar view of a milking machine having a throttled by-pass conduit.

In the milking machine 1 disclosed in FIG. 8, the influencing means comprises a by-pass conduit 42 in parallel with the pulsator 11 and connecting the high-pressure passage 15 with the pulsation passage 12. The by-pass conduit 42 comprises a valve 43, which is provided to open the by-pass conduit 42 to permit transmission of a throttled amount of high pressure HP during the transmission of the low pressure LP from the low-pressure source 9, thereby reducing the efficiency of the low-pressure transmission.

In a further embodiment (not shown) of the milking machine 1, the influencing means may comprise a pulsator valve having an asymmetric opening, wherein said valve being provided to open and close, respectively, relatively fast in order to produce said relatively high-efficiency transmission and relatively slow in order to produce said relatively low-efficiency transmission.

The intermediate pressure level 22 at which the change between high-efficiency transmission and low-efficiency transmission should take place may in a first mode of operation be predetermined. Since the present invention aims at slowing down the movement of the teatcup liner 4, it may be desirable during the opening phase to change from high-efficiency transmission to low-efficiency transmission when the teatcup liner 4 starts to open. Thus, the intermediate pressure 22 may be determined as the momentary pressure which has been reached in the pulsation chamber 5 a predetermined fixed time interval after the beginning of one pulsation cycle. Thereby, the time interval should be such that it corresponds to the time interval which normally elapses from the start of the pulsation cycle to the start of the opening of the teatcup liner 4. Thus, it is not necessary to identify the intermediate pressure level 22. Such predetermined intermediate pressure level 22 may also be taken to prevail at the point of time from the beginning of the pulsation cycle when the milk flow from the teat of the cow usually starts.

It may also be possible to regulate when the change between low-efficiency transmission and high-efficiency transmission should take place in response to the actual milk flow, sensed by the flow sensor 16, or the actual abrupt movement of the teatcup liner 4, sensed by the sensor 17. For example by detecting the actual milk flow during one pulsation cycle by means of the flow meter 16, the control device 18 may adjust activation of the throttle valve 26 in the next pulsation cycle in response to said detected milk flow. In the embodiment disclosed in FIG. 2 the control device 18 may adjust the delay time of the non-return valve 28 in response to said detected milk flow. In the same way the control device 18 may adjust the level of the servo-pressure in the servo-pressure source in response to the detected milk flow in the embodiments disclosed in FIGS. 3 and 4. Moreover, the control device 18 may also activate adjustment of the volume in the buffer 35 in response to said detected milk flow in the embodiment disclosed in FIG. 5. Also the pressure level of the third pressure source 38 of the embodiment disclosed in FIG. 7 may be adjusted by means of the control device 18 in response to said detected milk flow.

The sensor 17 may be a pressure sensor and by sensing the momentary pressure in the pulsation chamber 5 it is possible to detect the TPD-level or CCPD-level. The opening movement of the teatcup liner 4 essentially occurs between the TPD-level and the CCPD-level and the closing movement essentially between the CCPD-level and the TPD-level. The opening movement and closing movement of the teatcup liner 4 are very abrupt. Due to this abrupt opening and closing movement of the teatcup liner 4 the volume of the pulsation chamber 5 abruptly decreases and increases, respectively. This volume change results in a temporary interruption of the decrease and increase, respectively, of the momentary pressure in the pulsation chamber 5, which gives rise to a distinct irregularity at the pressure curve, which may be detected by the pressure sensor 17. Since the TPD-level corresponds to the beginning of the opening movement of the teatcup liner 4, this detected level may be taken as the intermediate pressure level 22. Thereby, the control device 18 may be provided to adjust the different influencing means disclosed above in response to said detected TPD-level to initiate the change from high-efficiency transmission to low-efficiency transmission during the opening movement of the teatcup liner 4 and the change from low-efficiency transmission to high efficiency transmission during the closing movement of the teatcup liner 4.

The sensor 17 may also be provided to detect the momentary volume change in the pulsation chamber 5. Thereby, the sensor 17 may be formed as a flow meter measuring a flow to and from the pulsation chamber 5. When the air flow exceeds a certain level, this is an indication that the teatcup liner 4 abruptly moves between an essentially open and an essentially closed position. Furthermore, the sensor 17 may be in a form of a distance measuring device measuring the distance between the shell 3 and the teatcup liner 4 and when a distance abruptly changes, this is an indication that the teatcup liner 4 abruptly moves between an essentially closed and an essentially open position.

The present invention is not limited to the embodiments disclosed, but may be varied within the scope of the claims. The present invention may be applied to fully automatic milking and milking requiring manual attachment of the teatcups and is suitable for milking of all animals which can be milked, such as cows, sheep, goats, buffaloes, camels, and horses.

We claim:

1. A method of milking an animal by a milking machine having a teatcup with a teatcup liner and a pulsation chamber, a first pressure source for generating a first pressure, and a second pressure source for generating a sub-atmospheric second pressure which is lower than the first pressure, the method comprising:

connecting the second pressure source to the interior of the teatcup liner; and alternately transmitting the first pressure from the first pressure source and the second pressure from the second pressure source to the pulsation chamber to generate a pulsating pressure in the pulsation chamber, whereby the teatcup liner cyclically moves with a decreasing opening rate to an essentially open position during the transmission of the second pressure and with a decreasing closing rate to an essentially closed position during the transmission of the first pressure, wherein at least one of the first pressure and the second pressure is transmitted from the first pressure source and the second pressure source, respectively, to the pulsation chamber at a relatively high efficiency when the momentary pressure in the pulsation chamber is higher than an intermediate pressure, which is lower than the first pressure and higher than the second pressure, and at a relatively low efficiency when the momentary pressure in the pulsation chamber is equal to or is lower than said intermediate pressure.

2. A method according to claim 1, wherein said relatively high-efficiency pressure transmission takes place through at least one passage and that said relatively low-efficiency pressure transmission is produced by throttling said passage.

3. A method according to claim 1, wherein said relatively low-efficiency pressure transmission is produced by simultaneously transmitting the first pressure from the first pressure source and the second pressure from the second pressure source.

4. A method according to claim 1, including the step of determining that the momentary pressure in the pulsation chamber is equal to or is lower than said intermediate pressure when the teatcup liner abruptly moves to said open position, and is higher than said intermediate pressure when the teatcup liner has abruptly moved to said closed position.

5. A method according to claim 4, including the steps of sensing the movement of the teatcup liner when the teatcup liner abruptly moves to one of the open and closed positions, and using said sensed abrupt movement of the teatcup liner for determining whether said relatively high- or low-efficiency transmission is to be performed.

6. A method according to claim 1, including the steps of detecting the point of time when the milk flow from a teat of the animal during at least one pulsation cycle starts or ceases, and determining that the intermediate pressure prevails in the pulsation chamber at said point of time.

7. A method according to claim 1, including the steps of detecting the point of time when the volume of the pulsation chamber abruptly changes, and determining that the intermediate pressure prevails in the pulsation chamber at said point of time.

8. A method according to claim 1, wherein said intermediate pressure is predetermined.

9. A method according to claim 1, wherein said intermediate pressure is defined as the momentary pressure which has been reached in the pulsation chamber a predetermined fixed time interval after the beginning of one of the pulsation cycles.

10. A milking machine comprising:

at least one teatcup having a teatcup liner and a pulsation chamber;

a first pressure source for generating a first pressure;

a second pressure source for generating a sub-atmospheric second pressure which is lower than the first pressure;

conduit means for transmitting the first pressure and the second pressure, respectively, from the first pressure source and the second pressure source, respectively, to the pulsation chamber;

a pulsator for alternately connecting the first pressure source and the second pressure source to the pulsation chamber via the conduit means, such that the teatcup liner cyclically moves with a decreasing opening rate to an essentially open position during the transmission of the second pressure and with a decreasing closing rate to an essentially closed position during the transmission of the first pressure; and means for influencing the transmission of at least one of the first pressure and the second pressure from the first pressure source and the second pressure source, respectively, to the pulsation chamber such that the efficiency of said pressure transmission is relatively high when the momentary pressure in the pulsation chamber is higher than an intermediate pressure, which is lower than the first pressure and higher than the second pressure, and is relatively low when the momentary pressure in the pulsation chamber is equal to or is lower than said intermediate pressure.

11. A milking machine according to claim 10, wherein the influencing means comprises throttling means provided on the conduit means to throttle the transmission of said at least one of the first pressure and the second pressure to produce said relatively low-efficiency transmission.

12. A milking machine according to claim 11, wherein the throttling means comprises a valve having an opening with a cross-section area which is variable between a first relatively small opening to produce said relatively low-efficiency transmission and a second relatively large opening to produce said relatively high-efficiency transmission.

13. A milking machine according to claim 11, wherein the influencing means comprises a by-pass conduit in parallel with the throttling means and wherein a valve is provided in the by-pass conduit such that said relatively high-efficiency transmission is produced when the valve is open and said relatively low-efficiency transmission is produced when the valve is closed.

14. A milking machine according to claim 13, the valve is a servo-valve connected to a servo-pressure source, delivering a servo-pressure corresponding to said intermediate pressure, such that the servo-valve is open when the momentary pressure in the pulsation chamber is higher than the servo-pressure, and closed when the momentary pressure in the pulsation chamber equals to or is lower than the servo-pressure.

15. A milking machine according to claim 13, wherein the valve is a non-return valve having a delay function such that the non-return valve operates to close the by-pass conduit when the momentary pressure in the pulsation chamber has reached said intermediate pressure.

16. A milking machine according to claim 11, wherein the throttling means is provided on the conduit means between the pulsator and one of said first pressure source and second pressure source and that the influencing means comprises a buffer means provided on the conduit between the pulsator and the throttling means.

17. A milking machine according to claim 16, wherein the buffer means has a variable buffer capacity.

18. A milking machine according to claim 11, wherein the throttling means comprises a pulsator valve having an asymmetric opening, said valve being provided to open and close, respectively, relatively fast to produce said relatively high-efficiency transmission and relatively slow to produce said relatively low-efficiency transmission.

19. A milking machine according to claim 10, wherein the influencing means comprises a servo-valve provided on the conduit means and connected to a servo-pressure source, delivering a servo-pressure corresponding to said intermediate pressure, such that the servo-valve is open when the momentary pressure in the pulsation chamber is higher than the servo-pressure, and closed when the momentary pressure in the pulsation chamber equals to or is lower than said servo-pressure, and a throttle opening is provided as an integrated part of the servo-valve and permitting a relatively low-efficiency transmission when the servo-valve is closed.

20. A milking machine according to claim 10, wherein the influencing means comprises a first and a second pulsator provided in parallel with each other on the conduit means, the first pulsator being throttled, and wherein the second pulsator is provided to open when the momentary pressure in the pulsation chamber is higher than said intermediate pressure, and to close when the momentary pressure in the pulsation chamber equals to or is lower than said intermediate pressure.

21. A milking machine according to claim 10, wherein the influencing means comprises a third pressure source for generating a third pressure corresponding to said intermediate pressure, the second pressure source is connected to the conduit means by a second conduit, the third pressure source is connected to the conduit means by a third conduit, the second and the third conduits are in parallel with each other, and the total cross-section area of the second and third conduits essentially equals that of the conduit means.

22. A milking machine according to claim 21, wherein a non-return valve is provided on the third conduit means.

23. A milking machine according to claim 10, wherein the influencing means comprises a by-pass conduit provided to connect the first pressure source and the second pressure source, respectively, with the conduit means between the pulsator and the pulsation chamber.

24. A milking machine according to claim 10, including a sensor provided for sensing the movement of the teatcup liner when the teatcup liner abruptly moves to one of the essentially open and closed positions.

25. A milking machine according to claim 24, wherein said sensor is a pressure sensor provided to detect the momentary pressure in the pulsation chamber when the teatcup liner abruptly moves to one of the essentially open and closed positions.

26. A milking machine according to claim 24, including control means provided to control the influencing means to change between said relatively high-efficiency transmission and said relatively low-efficiency transmission in response to the sensings from said sensor.

27. A milking machine according to claim 10, including a detector for detecting the point of time when the milk flow from the teat of the animal during at least one pulsation cycle starts or ceases.

28. A milking machine according to claim 10, including a detector for detecting the point of time when the volume of the pulsation chamber abruptly changes.

29. A milking machine according to claim 27, including control means for controlling the influencing means to change between said relatively high-efficiency transmission and said relatively low-efficiency transmission in response to said detector.

30. A milking machine according to claim 10, including further conduit means for transmitting the second pressure from the second pressure source to the interior of the teatcup liner.

* * * * *